(12) United States Patent
Yoshimura

(10) Patent No.: US 11,714,588 B2
(45) Date of Patent: Aug. 1, 2023

(54) INFORMATION PROCESSING APPARATUS, INFORMATION PROCESSING SYSTEM, AND NON-TRANSITORY COMPUTER READABLE MEDIUM FOR SELECTING JOBS

(71) Applicant: FUJIFILM Business Innovation Corp., Tokyo (JP)

(72) Inventor: Taku Yoshimura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/561,069

(22) Filed: Dec. 23, 2021

(65) Prior Publication Data
US 2023/0004337 A1   Jan. 5, 2023

(30) Foreign Application Priority Data
Jul. 2, 2021   (JP) .................................. 2021-110638

(51) Int. Cl.
*G06F 3/12*   (2006.01)

(52) U.S. Cl.
CPC ............ *G06F 3/1268* (2013.01); *G06F 3/126* (2013.01); *G06F 3/1207* (2013.01); *G06F 3/1232* (2013.01); *G06F 3/1255* (2013.01); *G06F 3/1256* (2013.01); *G06F 3/1272* (2013.01); *G06F 3/1285* (2013.01); *G06F 3/1293* (2013.01)

(58) Field of Classification Search
None
See application file for complete search history.

(56) References Cited

U.S. PATENT DOCUMENTS

| | | | |
|---|---|---|---|
| 2007/0081186 A1* | 4/2007 | Numata | G06F 3/1212 358/1.15 |
| 2015/0015908 A1* | 1/2015 | Tanaka | G06K 15/4095 358/1.14 |
| 2015/0212761 A1* | 7/2015 | Onose | G06F 3/1239 358/1.15 |

FOREIGN PATENT DOCUMENTS

JP   2018-025883 A   2/2018

* cited by examiner

*Primary Examiner* — Lennin R RodriguezGonzalez
(74) *Attorney, Agent, or Firm* — Sughrue Mion, PLLC

(57) ABSTRACT

An information processing apparatus includes a processor configured to: transmit authentication information to a first image forming apparatus; acquire, from the first image forming apparatus, job information acquired by the first image forming apparatus from a server using the authentication information, the job information being information on one or more jobs corresponding to the authentication information; cause a display to display a screen presenting the acquired job information; receive, on the displayed screen, selection of one or more jobs to print using the first image forming apparatus; and transmit selection information indicating one or more selected jobs selected by the selection to the first image forming apparatus to instruct the first image forming apparatus to acquire the one or more selected jobs from the server.

8 Claims, 16 Drawing Sheets

FIG. 16

LIST OF JOBS: IMAGE FORMING APPARATUS 20A

| | JOB 1 | 10 SHEETS | $1.00 |
| | JOB 2 | 2 SHEETS | $1.00 |
| | JOB 3 | 20 SHEETS | $2.00 |
| | JOB 4 | 5 SHEETS | $0.50 |
| | JOB 5 | 10 SHEETS | $5.00 |

TOTAL AMOUNT $____

LIST OF JOBS: IMAGE FORMING APPARATUS 20B

| | JOB 1 | 10 SHEETS | $2.00 |
| | JOB 2 | 2 SHEETS | $2.00 |
| | JOB 3 | 20 SHEETS | $4.00 |
| | JOB 4 | 5 SHEETS | $1.00 |
| | JOB 5 | 10 SHEETS | $10.00 |

TOTAL AMOUNT $____

CANCEL

TRANSMIT

INFORMATION PROCESSING APPARATUS, INFORMATION PROCESSING SYSTEM, AND NON-TRANSITORY COMPUTER READABLE MEDIUM FOR SELECTING JOBS

CROSS-REFERENCE TO RELATED APPLICATIONS

This application is based on and claims priority under 35 USC 119 from Japanese Patent Application No. 2021-110638 filed Jul. 2, 2021.

BACKGROUND

(i) Technical Field

The present disclosure relates to an information processing apparatus, an information processing system, and a non-transitory computer readable medium.

(ii) Related Art

Japanese Unexamined Patent Application Publication No. 2018-025883 discloses an image forming system that prints an image using easily and safely an image forming apparatus installed in a rental office as a destination of a user.

As ways of working in companies become versatile, the chance of telework in a rental office or shared office increases in addition to the traditional style of going to work in offices in office buildings.

The use of an information processing apparatus carried to a telework office may be contemplated as a printing method of an image forming apparatus installed in the telework office. In the printing method, if a user performs authentication using an authentication function of the information processing apparatus when a job is issued, an identification (ID) unique to the information processing apparatus is issued as authentication information. The unique ID is linked to the job and then transmitted to a server and jobs are thus accumulated on the server.

In the printing method described above, when the user authenticates the image forming apparatus using the authentication function of the information processing apparatus, a unique ID is transmitted to the image forming apparatus. The image forming apparatus transmits the unique ID from the information processing apparatus to the server. The server searches for a job having an ID matching the ID from the image forming apparatus and transmits the found job to the image forming apparatus. The image forming apparatus prints the job transmitted from the server.

In the printing method, however, the image forming apparatus performs all jobs having the matched ID. If there are multiple jobs having the matched ID, the server transmits all the jobs.

SUMMARY

Aspects of non-limiting embodiments of the present disclosure relate to causing an image forming apparatus to receive a job selected by a user out of jobs corresponding to authentication information if the image forming apparatus receives the jobs from a server using the authentication information transmitted from an information processing apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: transmit authentication information to a first image forming apparatus; acquire, from the first image forming apparatus, job information acquired by the first image forming apparatus from a server using the authentication information, the job information being information on one or more jobs corresponding to the authentication information; cause a display to display a screen presenting the acquired job information; receive, on the displayed screen, selection of one or more jobs to print using the first image forming apparatus; and transmit selection information indicating one or more selected jobs selected by the selection to the first image forming apparatus to instruct the first image forming apparatus to acquire the one or more selected jobs from the server.

BRIEF DESCRIPTION OF THE DRAWINGS

Exemplary embodiments of the present disclosure will be described in detail based on the following figures, wherein:

FIG. 16 illustrates an eighth display example displayed on the display of the information processing apparatus.

DETAILED DESCRIPTION

An information processing system 10 of exemplary embodiments of the disclosure is described.

First Exemplary Embodiment

Figure 1:
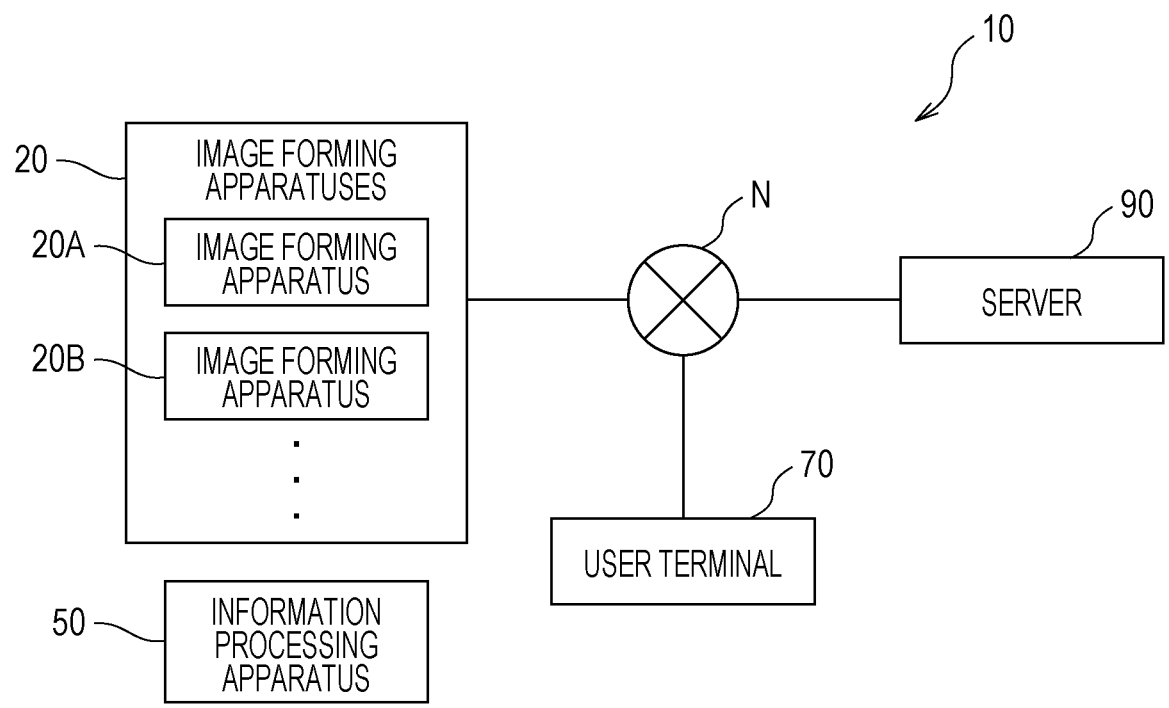
FIG. 1 illustrates a configuration of an information processing system.

FIG. 1 illustrates a configuration of the information processing system 10 of a first exemplary embodiment. The information processing system 10 performs a printing process on an image forming apparatus 20 installed at a telework office, such as a rental office or shared office.

Referring to FIG. 1, the information processing system 10 includes image forming apparatuses 20, information processing apparatus 50, user terminal 70, and server 90. The image forming apparatuses 20, user terminal 70, and server 90 are communicably interconnected to each other via a network N. The network N may include the Internet, local-area network (LAN), and/or wide-area network (WAN). The network N is an example of a "communication network."

The image forming apparatuses 20 include multiple image forming apparatuses, such as image forming apparatus 20A and image forming apparatuses 20B as illustrated in FIG. 1. One or more image forming apparatuses 20 may be installed at the telework office. The image forming apparatus 20 has, for example, a short-range communication function and is thus communicable with the information processing apparatus 50 via the short-range communication function.

The information processing apparatus 50 is a laptop, such as a personal computer (PC), or mobile terminal such as a smart phone or tablet terminal, carried by a user to the telework office. According to the first exemplary embodiment, the information processing apparatus 50 is a smart phone. The information processing apparatus 50 has, for example, a short-range communication function and is thus communicable with the image forming apparatus 20 and user terminal 70 via the short-range communication function. According to the first exemplary embodiment, for example, the near-field communication (NFC) is used as the short-range communication between the information processing apparatus 50 and image forming apparatus 20 and between the information processing apparatus 50 and user terminal 70.

The user terminal 70 may be a mobile terminal, such as a laptop, smart phone, or tablet terminal, carried by a user to the telework office. According to the first exemplary embodiment, the user terminal 70 is a laptop. For example, the user terminal 70 has the NFC function and is communicable with the information processing apparatus 50 via the near-field communication.

The server 90 in the information processing system 10 is a server computer that may accumulate multiple jobs printable by the image forming apparatus 20.

Figure 2:
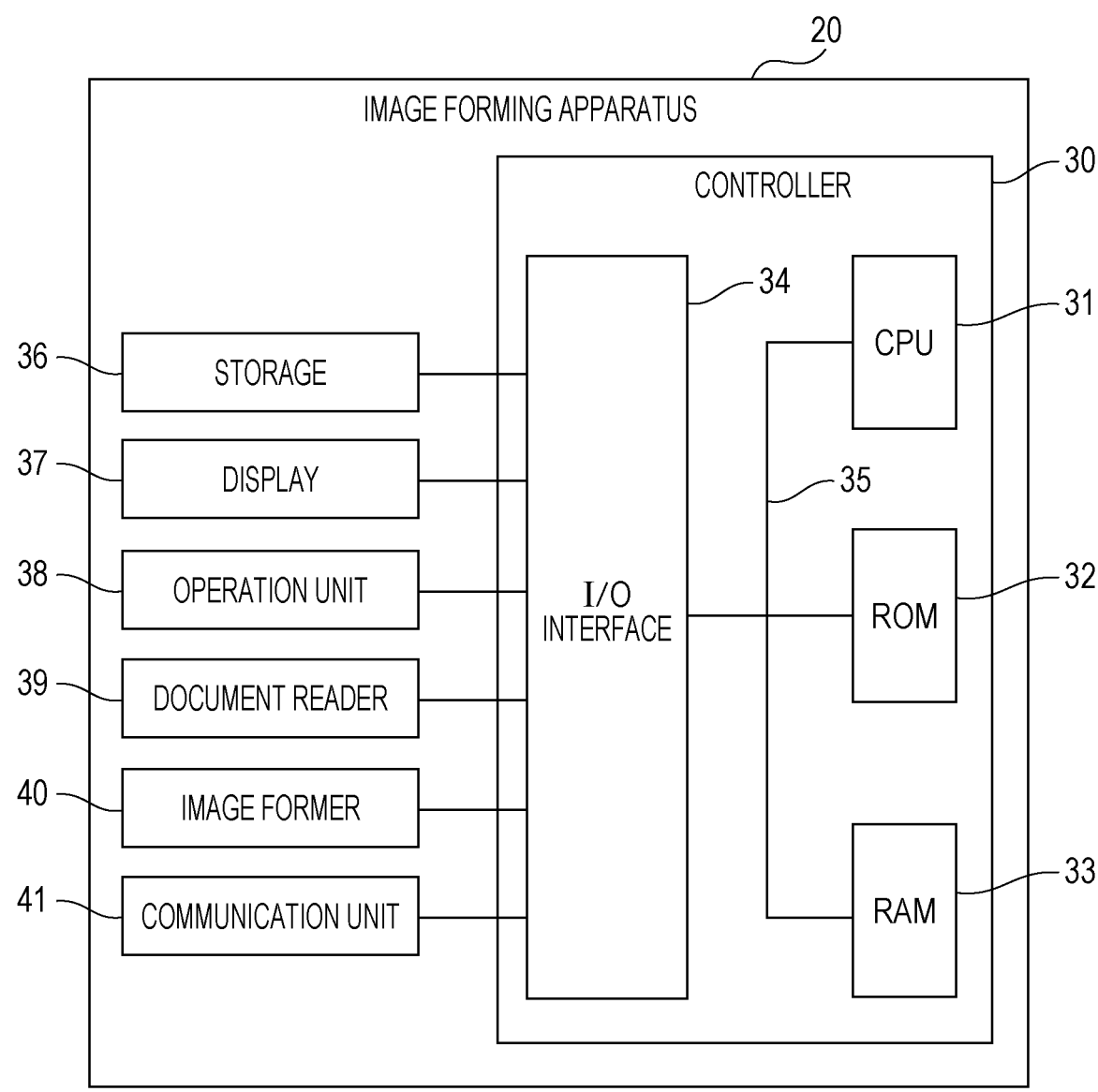
FIG. 2 is a block diagram illustrating a hardware configuration of an image forming apparatus.

FIG. 2 is a block diagram illustrating a hardware configuration of the image forming apparatus 20. Referring to FIG. 2, the image forming apparatus 20 includes a controller 30 that controls the image forming apparatus 20. The controller 30 includes a central processing unit (CPU) 31, read-only memory (ROM) 32, random-access memory (RAM) 33, and input and output interface (IF) 34 that interconnects these elements via a bus 35.

The CPU 31 executes a variety of programs and controls elements of the image forming apparatus 20. Specifically, the CPU 31 reads a program from the ROM 32 or a storage 36 described below and executes the program using the RAM 33 as a working area. In accordance with programs stored on the ROM 32 or storage 36, the CPU 31 controls the elements and performs a variety of arithmetic operations. According to the first exemplary embodiment, the ROM 32 or storage 36 stores an information processing program that performs at least a printing process described below. The information processing program may be installed beforehand on the image forming apparatus 20 or may be appropriately installed on the image forming apparatus 20 by storing the information processing program on a non-volatile memory or by delivering the information processing program via a network. An example of the non-volatile memory may be a compact disk read-only memory (CD-ROM), magnetooptical disk, hard disk drive (HDD), digital versatile disk read-only memory (DVD-ROM), flash memory, or memory card. The CPU 31 is an example of a "second processor."

The ROM 32 stores a variety of programs and a variety of data. The RAM 33 operates as a working area and temporarily stores a program or data.

An input and output (I/O) unit 34 connects to the storage 36, display 37, operation unit 38, document reader 39, image former 40, and communication unit 41. These elements are communicably interconnected to the CPU 31 via the I/O unit 34.

The storage 36 may include an HDD, solid-state drive (SSD), or flash memory and stores a variety of programs and a variety of data.

The display 37 may be a liquid-crystal display (LCD) or organic electroluminescent (EL) display. A touch panel may be integrated into the display 37.

The operation unit 38 includes a variety of operation keys including numeric keys and start key. The display 37 and operation unit 38 receive a variety of instructions from a user of the image forming apparatus 20. The instructions include an instruction to start reading a document and an instruction to start copying the document. The display 37 displays a variety of information including process results obtained by executing the instruction received from the user and notices about processes.

The document reader 39 acquires image information by picking up sheet by sheet a document placed on an automatic document feeder (not illustrated) arranged at the top of the image forming apparatus 20 and optically reading the picked-up sheet of the document. Alternatively, the document reader 39 may acquire image information by optically reading a document placed on a document holder, such as platen glass.

The image former 40 forms on a recording medium, such as paper sheet, an image that is based on image information read by the document reader 39 or image information acquired by an external PC connected thereto via the network N.

The communication unit 41 is an interface used to connect with another apparatus for communications. The communications comply with wired communication standards, such as Ethernet (registered trademark) or Fiber Distributed Data Interface (FDDI) or wireless communication standards, such as 4G, 5G, or Wi-Fi (registered trademark).

To execute the information processing program, the image forming apparatus 20 performs a process based on the information processing program using the hardware resources described above.

Figure 3:
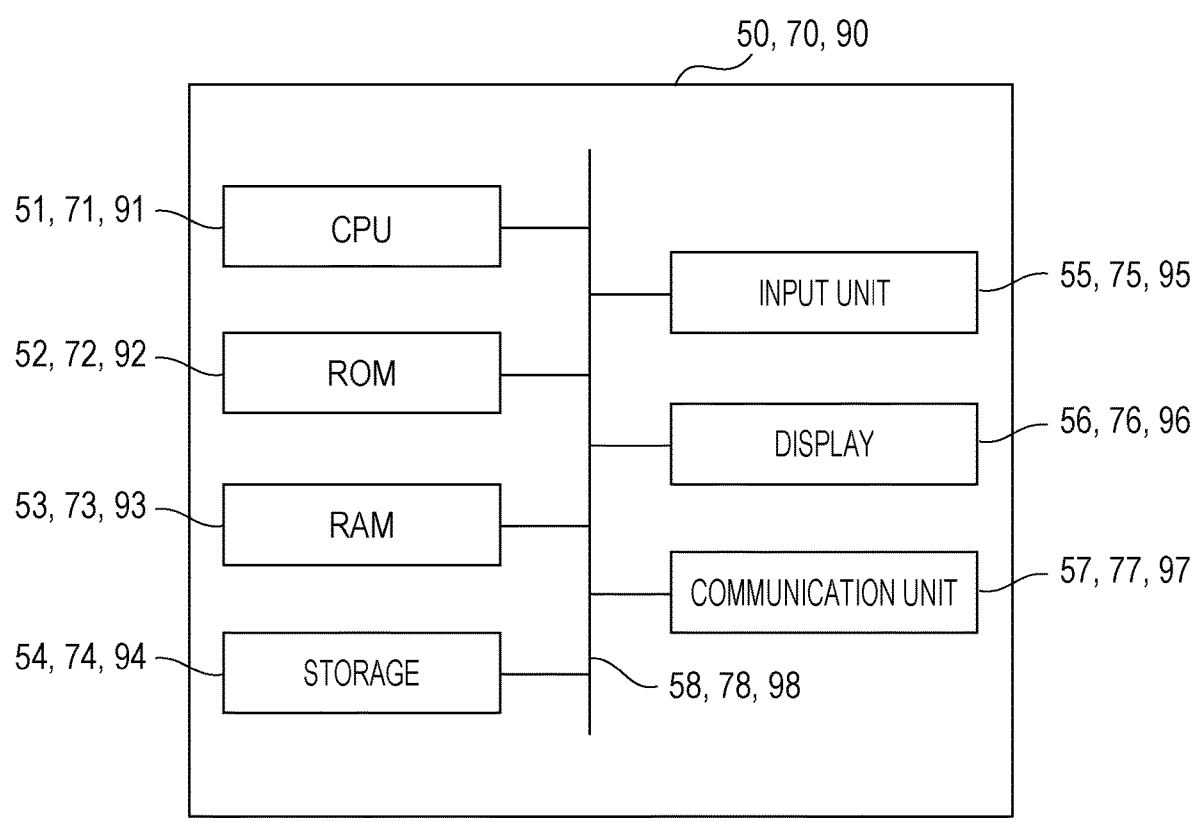
FIG. 3 is a block diagram illustrating a hardware configuration of an information processing apparatus, user terminal, and server.

FIG. 3 is a block diagram illustrating a hardware configuration of each of the information processing apparatus 50, user terminal 70, and server 90. Each of the information processing apparatus 50, user terminal 70, and server 90 is basically a typical computer and the information processing apparatus 50 is representatively described herein.

Referring to FIG. 3, the information processing apparatus 50 includes a CPU 51, ROM 52, RAM 53, storage 54, input unit 55, display 56, and communication unit 57. These elements are interconnected to each other via a bus 58 for communications.

The CPU 51 executes a variety of programs and controls elements of the information processing apparatus 50. The CPU 51 reads a program from the ROM 52 or the storage 54 and executes the program using the RAM 53 as a working area. In accordance with the program stored on the ROM 52 or the storage 54, the CPU 51 controls the elements and performs a variety of arithmetic operations. According to the first exemplary embodiment, at least the information processing program executing a printing process described below is stored on the ROM 52 or the storage 54. The information processing program may be installed beforehand on the information processing apparatus 50 or may be appropriately installed on the information processing apparatus 50 by storing the information processing program on a non-volatile recording medium or by delivering the information processing program via the network. An example of the non-volatile memory may be a CD-ROM, magnetooptical disk, HDD, DVD-ROM, flash memory, or memory card. The CPU 51 is an example of a "first processor."

The ROM 52 stores a variety of programs and a variety of data. The RAM 53 operates as a working area and temporarily stores a program or data.

The storage 54 may include an HDD, SSD, or flash memory and stores a variety of programs and a variety of data.

The input unit 55 includes, for example, a variety of buttons, microphone, and camera and is used to pick up a variety of input signals.

The display 56 is an LCD and displays a variety of information. The display 56 is a touch-panel type and also functions as the input unit 55. The display 56 is an example of a "screen."

The communication unit 57 is an interface used to connect with another apparatus for communications. The communications comply with wired communication standards, such as Ethernet (registered trademark) or FDDI or wireless communication standards, such as 4G, 5G, or Wi-Fi (registered trademark).

To execute the information processing program, the information processing apparatus 50 performs a process based on the information processing program using the hardware resources described above.

The flow of an accumulation process accumulating on the server 90 jobs transmitted from the user terminal 70 in the information processing system 10 is described below.

Figure 4:
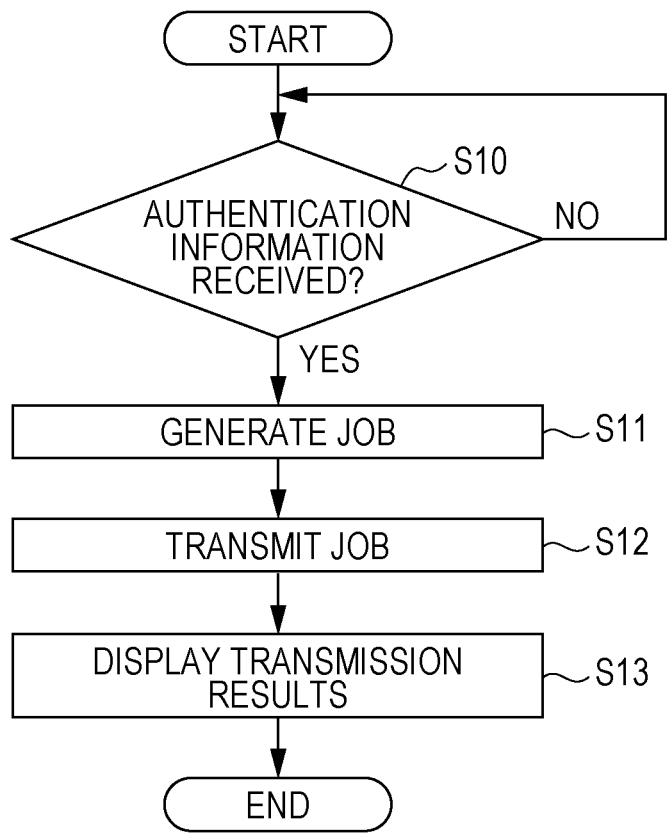
FIG. 4 is a flowchart illustrating a flow of an accumulation process performed by the user terminal.

FIG. 4 is a flowchart illustrating the flow of the accumulation process performed by the user terminal 70. A CPU 71 in the user terminal 70 performs the accumulation process by reading the information processing program from the ROM 72 or the storage 74 and loading the information processing program onto the RAM 73.

In step S10 in FIG. 4, the CPU 71 determines whether authentication information has been received from the information processing apparatus 50. If the CPU 71 determines that the authentication information has been received (yes path in step S10), the process proceeds to step S11. On the other hand, if the authentication information is not determined to have been received (no path in step S10), the CPU 71 waits on standby until the authentication information has been received. For example, if the CPU 71 receives the authentication information from the information processing apparatus 50 via the near-field communication (NFC) performed between the information processing apparatus 50 and the user terminal 70, the CPU 71 determines in step S10 that the authentication information has been received. The authentication information is an identification (ID) uniquely identifying the information processing apparatus 50 and is issued if a user has successfully authenticated the information processing apparatus 50.

In step S11, the CPU 71 generates a printing job on the image forming apparatus 20 in response to a user instruction and proceeds to step S12. For example, the job generated by the CPU 71 includes target data serving as a print target, job ID uniquely identifying the job, and printing information related to color setting, number of printing sheets, and paper sheet size setting.

In step S12, the CPU 71 transmits the job generated in step S11 to the server 90 and then proceeds to step S13. The CPU 71 links the authentication information received in step S10 to the job and then transmits the linked job to the server 90.

In step S13, the CPU 71 displays on a display 76 the transmission results of the job transmitted in step S12. The process thus ends. If the transmission results of the job are successful, information indicating that the transmission of the job has been successful is displayed on the display 76. If the transmission of the job has failed, information indicating that the transmission of the job has failed is displayed on the display 76.

Figure 5:
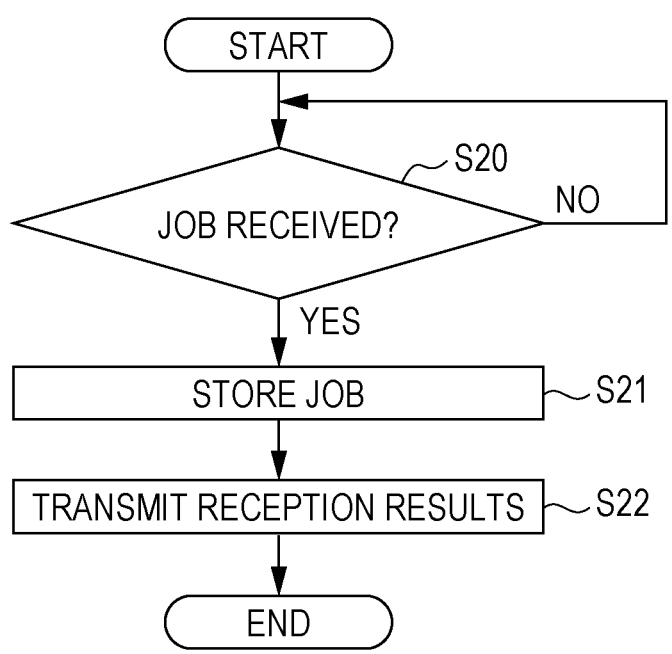
FIG. 5 is a flowchart illustrating a flow of an accumulation process performed by the server.

FIG. 5 is a flowchart illustrating the flow of the accumulation process performed by the server 90. A CPU 91 in the server 90 performs the accumulation process by reading the information processing program from a ROM 92 or storage 94 and loading the information processing program to a RAM 93. The CPU 91 is an example of a "third processor."

In step S20 in FIG. 5, the CPU 91 determines whether a job has received from the information processing apparatus 70. If the CPU 91 determines that the job has been received from the user terminal 70 (yes path in step S20), the process proceeds to step S21. On the other hand, if the job is not determined to have been received (no path in step S20), the CPU 91 waits on standby until the job has been received. For example, if the job transmitted in step S12 in FIG. 4 from the user terminal 70 has been received, the CPU 91 determines that the job has been received in step S20. If the job has been received, the CPU 91 has also received the authentication information linked to the job.

In step S21, the CPU 91 stores the job received in step S20 on the storage 94 in the form of a list that links the job ID and authentication information with the job. The process proceeds to step S22.

In step S22, the CPU 91 transmits to the user terminal 70 information, indicating that the job has been successfully received, as receptions results of the job received in step S20. The process thus ends.

The flow of the printing process of the information processing system 10 where the jobs accumulated on the server 90 are printed on the image forming apparatus 20 is described below.

Figure 6:
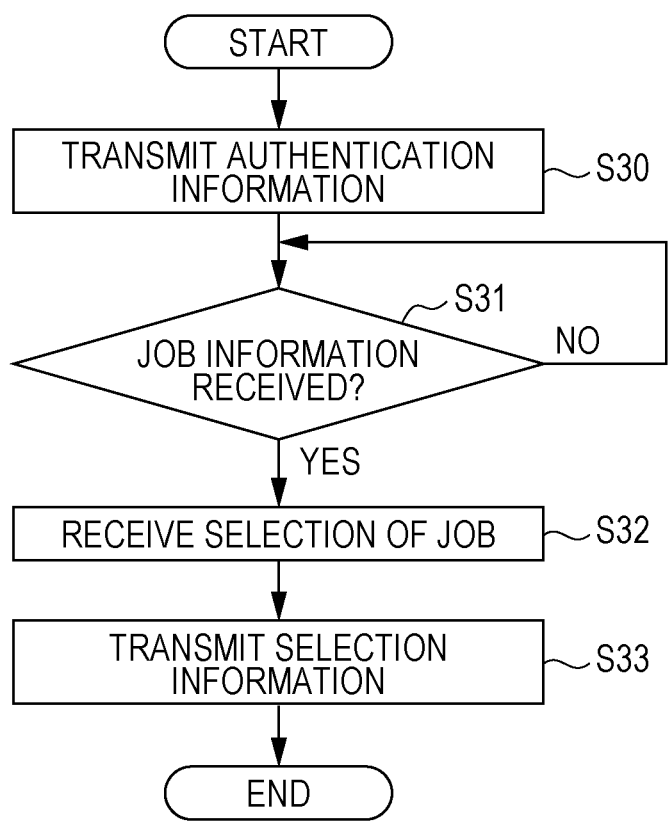
FIG. 6 is a flowchart illustrating a flow of a printing process performed by the information processing apparatus.

FIG. 6 is a flowchart illustrating the flow of the printing process performed by the information processing apparatus 50. The CPU 51 in the information processing apparatus 50 performs the printing process by reading the information processing program from the ROM 52 or the storage 54 and loading the information processing program onto the RAM 53.

In step S30 in FIG. 6, the CPU 51 transmits the authentication information to the image forming apparatus 20 and proceeds to step S31. The authentication information transmitted herein is identical to the authentication information transmitted to the user terminal 70 in step S10 in FIG. 4.

In step S31, the CPU 51 determines whether job information corresponding to the authentication information transmitted in step S30, specifically, the job information indicating a job with matched authentication information, has been received from the image forming apparatus 20. If the job information is determined to have been received (yes path in step S31), the process proceeds to step S32. On the other hand, if the job information is not determined to have been received (no path in step S31), the CPU 51 waits on standby until the job information has been received. For example, if the job information transmitted from the image forming apparatus 20 in step S42 in FIG. 7 as will be described below is received, the CPU 51 determines in step S31 that the job information has been received. The job information includes at least information that uniquely identifies each job and is smaller in information amount than a job to be transmitted from the server 90 to the image forming apparatus 20 in step S54 in FIG. 8. According to the first exemplary embodiment, for example, the job information includes a job ID corresponding to a job, number of printing sheets, and a printing fee. The printing fee is an example of a "fee of printing."

In step S32, the CPU 51 displays on the display 56 the job information received in step S31 and receives on the display 56 a selection of a job that has the matched authentication information transmitted in step S30 and that the image forming apparatus 20 has acquired from the server 90 for printing. The process proceeds to step S33. A display example on the display 56 in step S32 is described below.

In step S33, the CPU 51 transmits to the image forming apparatus 20 selection information indicating the selection of the job received in step S32. The process thus ends. The selection information includes at least information that uniquely identifies the job selected by a user. According to the first exemplary embodiment, for example, the selection information includes the job ID of the job and the order of selection of the jobs by the user.

Figure 7:
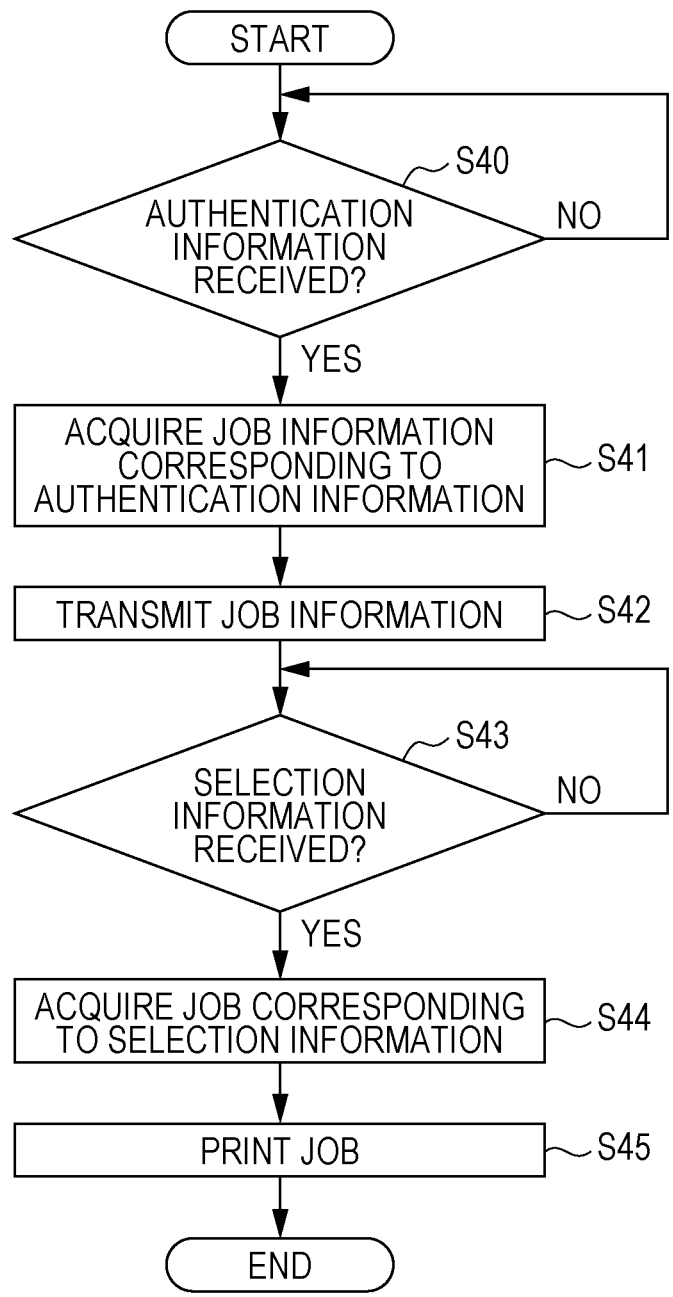
FIG. 7 is a flowchart illustrating a flow of a printing process performed by the image forming apparatus.

FIG. 7 is a flowchart illustrating the flow of the printing process performed by the image forming apparatus 20. The CPU 31 in the image forming apparatus 20 performs the printing process by reading the information processing program from the ROM 32 or the storage 36 and loading the information processing program onto the RAM 33.

In step S40 in FIG. 7, the CPU 31 determines whether the authentication information has been received from the information processing apparatus 50. If the authentication information is determined to have been received (yes path in step S40), the process proceeds to step S41. If the authentication information is not determined to have been received (no path in step S40), the CPU 31 waits on standby until the authentication information has been received. For example, the CPU 31 performs the NFC between the image forming apparatus 20 and the information processing apparatus 50 and if the authentication information has been received from the information processing apparatus 50 via the NFC, the CPU 31 determines in step S40 that the authentication information has been received.

In step S41, the CPU 31 acquires job information indicating a job having the matched authentication information received in step S40 from among the jobs accumulated on the server 90. The process proceeds to step S42. Specifically, the CPU 31 transmits the authentication information received in step S40 to the server 90 and acquires, in response to the transmission, the job information indicating a job having the matched authentication information transmitted from the server 90 in step S52 in FIG. 8.

In step S42, the CPU 31 transmits the job information acquired in step S41 to the information processing apparatus 50. The process proceeds to step S43.

In step S43, the CPU 31 determines whether the selection information has been received from the information processing apparatus 50. If the selection information is determined to have been received (yes path in step S43), the process proceeds to step S44. If the selection information is not determined to have been received (no path in step S43), the CPU 31 waits on standby until the selection information has been received. For example, if the selection information transmitted from the information processing apparatus 50 in step S33 in FIG. 6 is received, the CPU 31 determines in step S43 that the selection information has been received.

In step S44, the CPU 31 acquires, from the jobs accumulated on the server 90, a job corresponding to the selection information received in step S43, namely, a job having a job ID matching the selection information. The process proceeds to step S45. Specifically, the CPU 31 transmits the selection information received in step S43 to the server 90 and, in response to the transmission, acquires a job having a job ID matching the selection information to be transmitted from the server 90 in step S54 in FIG. 8.

In step S45, the CPU 31 prints the job acquired in step S44. The process thus ends. Specifically, the CPU 31 starts printing the jobs in the selection order of jobs included in the selection information transmitted in step S44.

Figure 8:
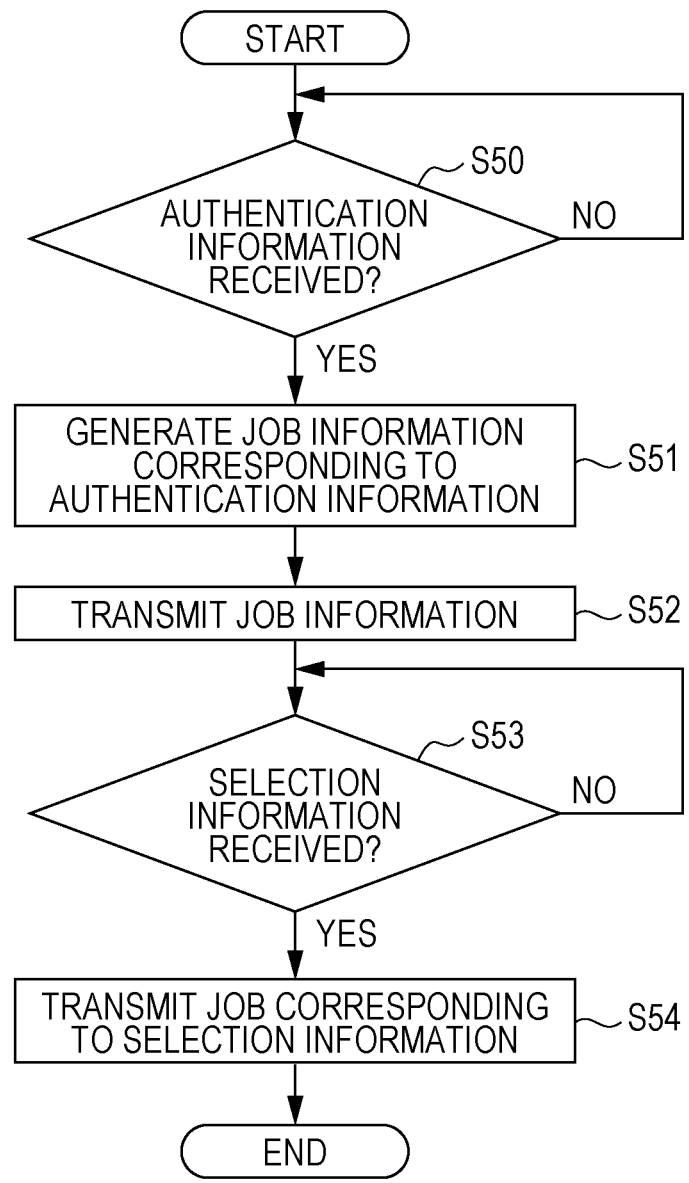
FIG. 8 is a flowchart illustrating a flow of a printing process performed by the server.

FIG. 8 is a flowchart illustrating the flow of the printing process performed by the server 90. The CPU 91 in the server 90 performs the printing process by reading the information processing program from the ROM 92 or the storage 94 and loading the information processing program onto the RAM 93.

In step S50 in FIG. 8, the CPU 91 determines whether the authentication information has been received from the image forming apparatus 20. If the authentication information is determined to have been received (yes path in step S50), the process proceeds to step S51. On the other hand, if the authentication information is not determined to have been received (no path in step S50), the CPU 91 waits on standby until the authentication information has been received. For example, if the authentication information transmitted from the image forming apparatus 20 in step S41 in FIG. 7 has been received, the CPU 91 determines in step S50 that the authentication information has been received.

In step S51, the CPU 91 searches the storage 94 for a job having the matched authentication information received in step S50. The process proceeds to step S52. Specifically, the CPU 91 searches the storage 94 for the job having the matched authentication information by checking the authentication information received in step S50 against the authentication information linked to the job accumulated on the storage 94.

According to the first exemplary embodiment, the image forming apparatus 20A, the image forming apparatus 20B, etc. included in the image forming apparatuses 20 connected to the network N are based on the same fee structure. The fee information on printing on the image forming apparatus 20 is stored on the storage 94 in the server 90. The fee information in the first exemplary embodiment includes information indicating "$0.50" for a sheet of color printing and "$0.10" for a sheet of monochrome printing. In step S51, the CPU 91 calculates a printing fee for each job in accordance with printing information included in the job found in the search and generates job information related to a printing fee, job ID, and number of printing sheets.

In step S52, the CPU 91 transmits the job information generated in step S51 to the image forming apparatus 20. The process proceeds to step S53.

In step S53, the CPU 91 determines whether the selection information has been received from the image forming apparatus 20. If the selection information is determined to have been received (yes path in step S53), the process proceeds to step S54. If the selection information is not determined to have been received (no path in step S53), the CPU 91 waits on standby until the selection information has been received. For example, if the selection information transmitted from the image forming apparatus 20 in step S44 in FIG. 7 is received, the CPU 91 determines in step S53 that the selection information has been received.

In step S54, the CPU 91 transmits to the image forming apparatus 20 a job having a job ID matching a job ID included in the selection information received in step S53. The process thus ends. Specifically, the CPU 91 searches the storage 94 for the job having the matched job ID by checking the job ID included in the selection information received in step S53 against the job ID of the job accumulated on the storage 94. The CPU 91 then transmits the job having the matched job ID to the image forming apparatus 20.

Display examples displayed on the display 56 in the information processing apparatus 50 in step S32 in FIG. 6 are described below.

Figure 9:
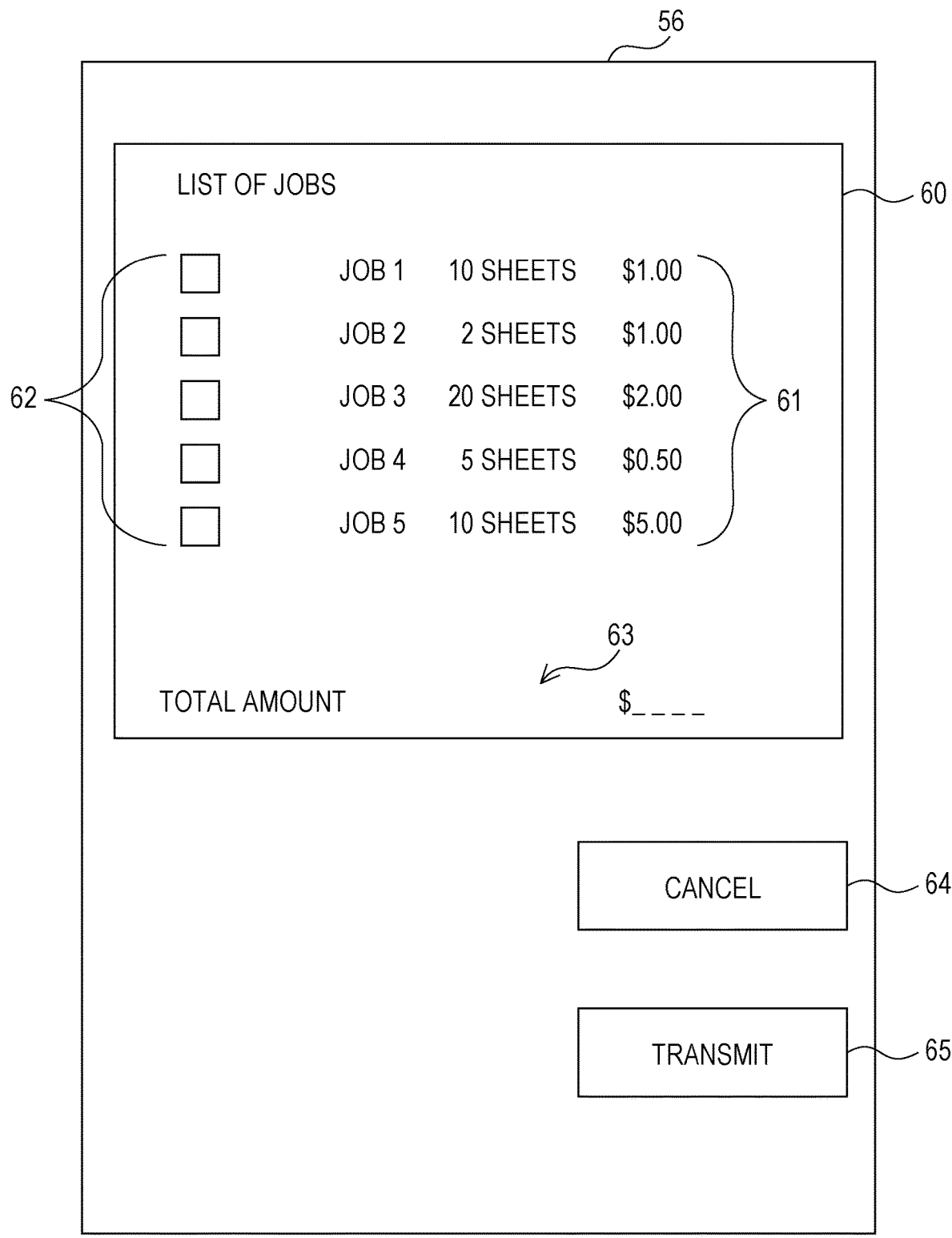
FIG. 9 illustrates a first display example displayed on a display of the information processing apparatus.

FIG. 9 illustrates a first display example displayed on the display 56 in the information processing apparatus 50. The display example in FIG. 9 displays a job display region 60, cancel button 64, and transmit button 65.

The job display region 60 displays a list of jobs having the matched authentication information. For example, the job display region 60 in FIG. 9 includes job information display sub-regions 61, reception sub-regions 62 arranged at the left hand side of the job information display sub-regions 61, and a total amount display sub-region 63.

Each job information display sub-region 61 displays the job information including a job ID of each job, numbers of printing sheets, and printing fees. The CPU 51 causes the job information display sub-region 61 to display the job information received in step S31 in FIG. 6. For example, the job information display sub-region 61 at the top row in FIG. 9 displays a job ID "job 1," number of printing sheets "10 sheets," and printing fee "$1.00."

Jobs may be acquired by the image forming apparatus 20 from the server 90 and have the matched authentication information. The reception sub-region 62 may receive a selection of a job selected by the user. If the user selection has not been accepted, a square mark is displayed. If the user selection has been accepted, a number indicating the selection of the job by the user is displayed. All the reception sub-regions 62 denoted by the square marks in the display example in FIG. 9 indicate that the user selection has not been accepted by any of the reception sub-regions 62.

The total amount display sub-region 63 displays a total amount of printing fees of jobs that the image forming apparatus 20 has acquired from the server 90 for printing and have the matched authentication information. The CPU 51 sums the printing fees displayed in the job information display sub-regions 61 corresponding to the reception sub-regions 62 that have accepted the selection by the user and causes the total amount display sub-region 63 to display the total amount of the printing fees. Since the selection by the user is not accepted by any of the reception sub-regions 62, the total amount display sub-region 63 displays "total amount $_____ in FIG. 9.

The cancel button 64 is used to cancel the operation performed by the user on the job display region 60. For example, when the cancel button 64 is operated, the CPU 51 changes display contents on the job display region 60 to a default state where the selection by the user is not accepted by any of the reception sub-regions 62 in FIG. 9.

The transmit button 65 is used to transmit the selection information to the image forming apparatus 20. The transmit button 65 is configured to be inoperative if the selection by the user is not accepted by any of the reception sub-regions 62. If the transmit button 65 is inoperative, the characters of the transmit button 65 may be grayed out to indicate that the transmit button 65 is inoperative.

Figure 10:
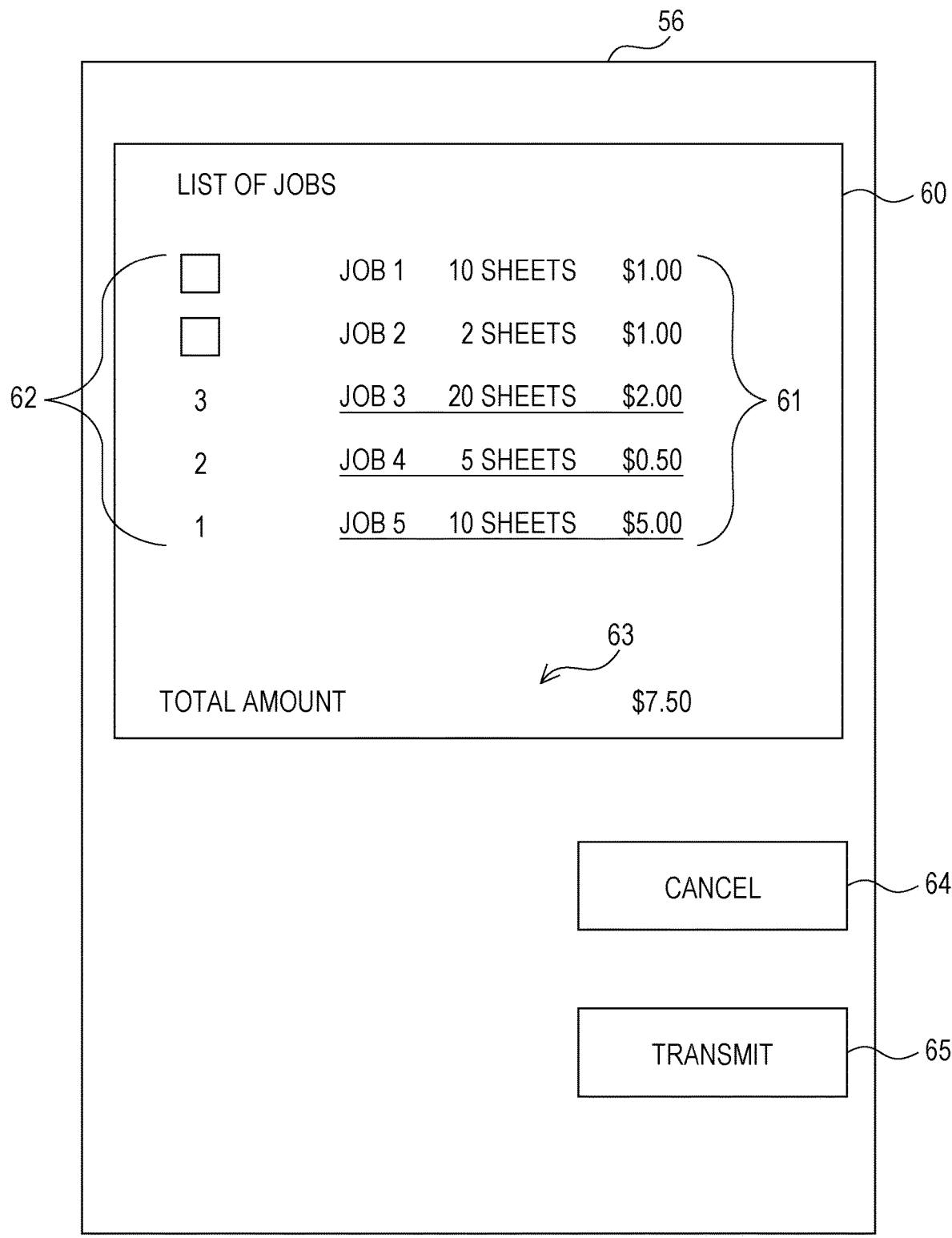
FIG. 10 illustrates a second display example displayed on the display of the information processing apparatus.

FIG. 10 illustrates a second display example displayed on the display 56 in the information processing apparatus 50. The second display example in FIG. 10 indicates a state after the selection by the user is accepted by three reception sub-regions 62 in the display example in FIG. 9.

The three reception sub-regions 62 in FIG. 10 displays numbers "1," "2," and "3" from below as numbers of selection order of jobs by the user. The job information displayed on the job information display sub-regions 61 corresponding to the reception sub-regions 62 having accepted the selection by the user is underlined. In addition to or instead of underlining the job information, the color of the characters indicated by the job information may be changed.

The total amount display sub-region 63 in FIG. 10 displays "total amount $7.50" as the total amount that is the sum of the printing fees displayed in three lower job information display sub-regions 61.

When the transmit button 65 is operated in the state in FIG. 10, the selection information is transmitted to the image forming apparatus 20 and transmission results of the selection information are displayed on the display 56. If the transmission of the selection information to the image forming apparatus 20 is complete, the display 56 displays, for example, a message reading "Transmission is complete" (though the message is not illustrated in FIG. 10).

Figure 11:
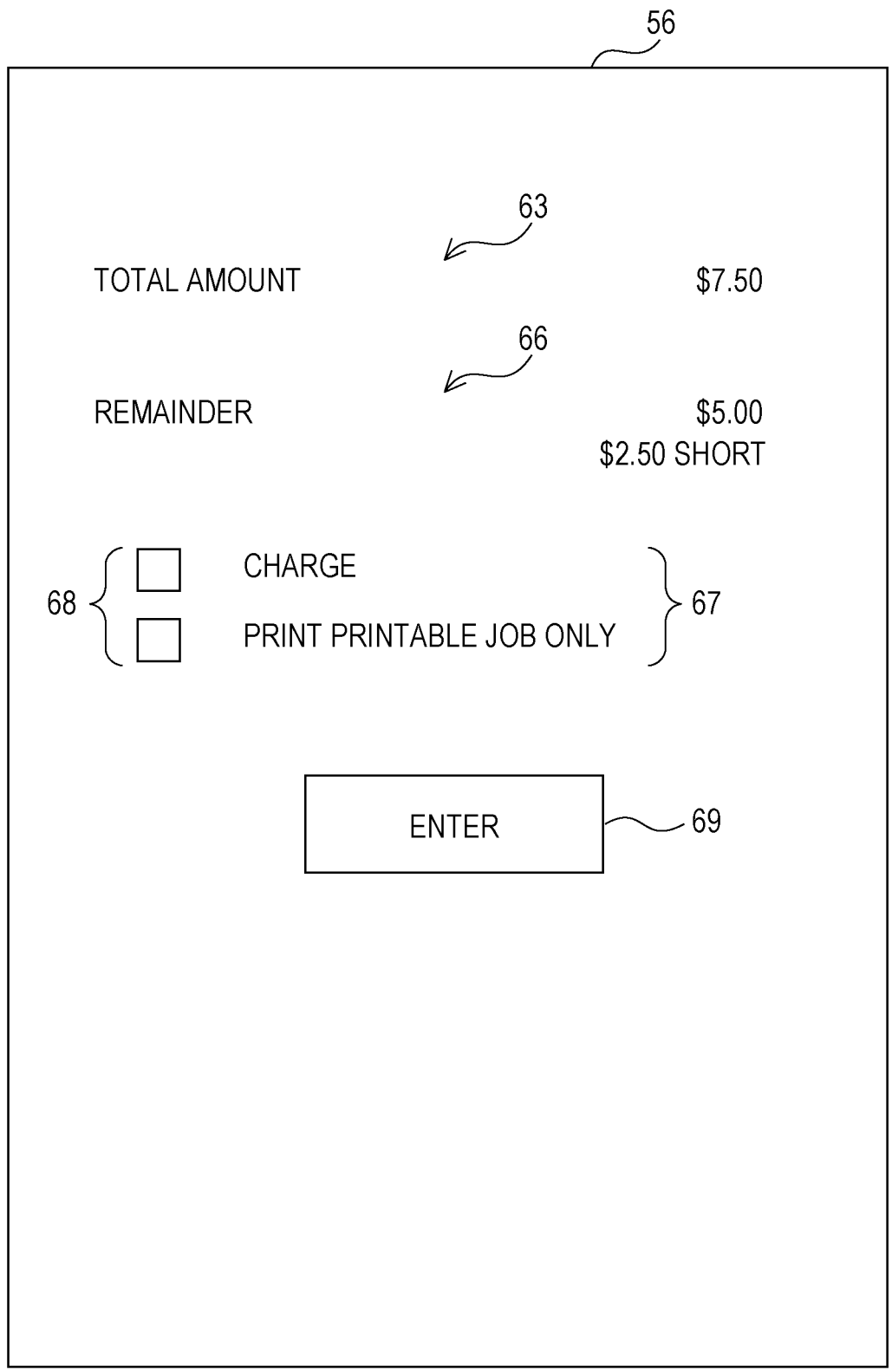
FIG. 11 illustrates a third display example displayed on the display of the information processing apparatus.

On the other hand, when the transmission of the selection information to the image forming apparatus 20 is not complete, a third display example illustrated in FIG. 11 is displayed.

FIG. 11 illustrates the third display example displayed on the display 56 in the information processing apparatus 50. The third display example in FIG. 11 indicates a state after the transmit button 65 is operated in the display example in FIG. 10.

The third display example in FIG. 11 displays the total amount display sub-region 63, remainder display sub-region 66, message display sub-regions 67, check boxes 68, and enter button 69.

The total amount display sub-region 63 in FIG. 11 indicates that the total amount of printing fees of the jobs that are intended to be printed on the image forming apparatus 20 is "$7.50."

The remainder display sub-region 66 displays a remainder of electronic money stored on the information processing apparatus 50 and available to pay for printing on the image forming apparatus 20. For example, the remainder display sub-region 66 in FIG. 11 displays that a remainder of electronic money is "$5.00" and information indicating a shortage amount is "$2.50 short."

The message display sub-regions 67 display a message to the user. For example, the upper message display sub-region 67 in FIG. 11 displays "Charge," and the lower message display sub-region 67 displays "Print printable job only."

The check boxes 68 are arranged on the left hand side of the message display sub-regions 67 and one of upper and lower check boxes 68 may be selectable.

The enter button 69 is used to decide to perform the contents indicated by the message in the message display sub-region 67 corresponding to the check box 68 selected by the user. If neither of upper and lower check boxes 68 is selected, the enter button 69 is set to be inoperative. When the enter button 69 is operated with the upper check box 68 selected, the CPU 51 causes to be displayed on the display 56 a charge screen (not illustrated) used to charge an amount to the remainder in electronic money. After the shortage amount is charged on the charge screen, the CPU 51 then causes the display example in FIG. 9 to be displayed again on the display 56.

If the enter button 69 is operated with the lower check box 68 selected, the CPU 51 transmits to the image forming apparatus 20 the selection information including only jobs printable in the selection order of jobs selected by the user. For example, the CPU 51 transmits to the image forming apparatus 20 the selection information including only the jobs corresponding to the lowest reception sub-region 62 out of the three lower reception sub-regions 62 selected in the display example in FIG. 10.

The CPU 51 of the first exemplary embodiment transmits the authentication information to the image forming apparatus 20. The CPU 51 acquires from the image forming apparatus 20 the job information that the image forming apparatus 20 has acquired from the server 90 using the authentication information. The CPU 51 displays on the display 56 the job information acquired from the image forming apparatus 20 and receives on the display 56 a selection of a job that has the matched authentication information and that the image forming apparatus 20 has acquired for printing from the server 90. The CPU 51 also transmits to the image forming apparatus 20 the selection information indicating the job with the selection thereof received. In this way, according to the first exemplary embodiment, when the image forming apparatus 20 receives the job from the server 90 using the authentication information transmitted from the information processing apparatus 50, the image forming apparatus 20 may be allowed to receive any job selected by the user from among the jobs having the matched authentication information.

The CPU 51 of the first exemplary embodiment causes the display 56 to display the printing fee of the job that has the matched authentication information and that the CPU 51 has acquired from the image forming apparatus 20, having received the authentication information, out of multiple image forming apparatuses 20 connected to the network N of the server 90. In this way, according to the first exemplary embodiment, the user may be notified of the printing fee of the job having the matched authentication information. According to the first exemplary embodiment, the CPU 51 acquires information on the printing fee that is calculated using the fee information that is stored on the server 90 for printing on each of the image forming apparatuses 20 connected to the network N of the server 90. According to the first exemplary embodiment, the user may be notified of the printing fee that is calculated using the fee information that is centrally managed by the server 90. According to the first exemplary embodiment, since the fee information is centrally managed by the server 90, the fee information of multiple image forming apparatuses 20 connected to the network N is modified all at once.

Second Exemplary Embodiment

Second exemplary embodiment is described below while elements common to the first exemplary embodiment are briefly described or not described at all.

According to the second exemplary embodiment, the image forming apparatuses 20 including the image forming apparatus 20A, the image forming apparatus 20B, and the like, connected to the network N do not have a unified fee structure, and each image forming apparatus has its own fee structure. According to the second exemplary embodiment, each image forming apparatus 20 stores on the storage 36 the fee information about printing on the image forming apparatus 20. For example, the fee information about printing on the image forming apparatus 20A indicates "$0.50" for a sheet of color printing and "$0.10" for a sheet of monochrome printing, and the fee information about printing on the image forming apparatus 20B indicates "$1.00" for a sheet of color printing and "$0.20" for a sheet of monochrome printing.

Although the CPU 91 in the server 90 calculates the printing fee of each job in step S51 in FIG. 8 in the first exemplary embodiment, the CPU 31 in the image forming apparatus 20 calculates the printing fee in the second exemplary embodiment.

Specifically, according to the second exemplary embodiment, the CPU 91 in the server 90 does not calculate the printing fee in step S51 in FIG. 8, but generates the job information including a job ID of a job having the matched authentication information received in step S50, number of printing sheets, and color setting.

On the other hand, the CPU 31 in the image forming apparatus 20 calculates the printing fee of each job using the number of printing sheets and color setting acquired from the server 90 in step S42 in FIG. 7 and the fee information stored on the storage 36. The CPU 31 transmits to the information processing apparatus 50 the job information including the calculated printing fee, job ID, number of printing sheets, and color setting.

Display examples displayed on the display 56 in the information processing apparatus 50 in step S32 in FIG. 6 are described below.

Figure 12:
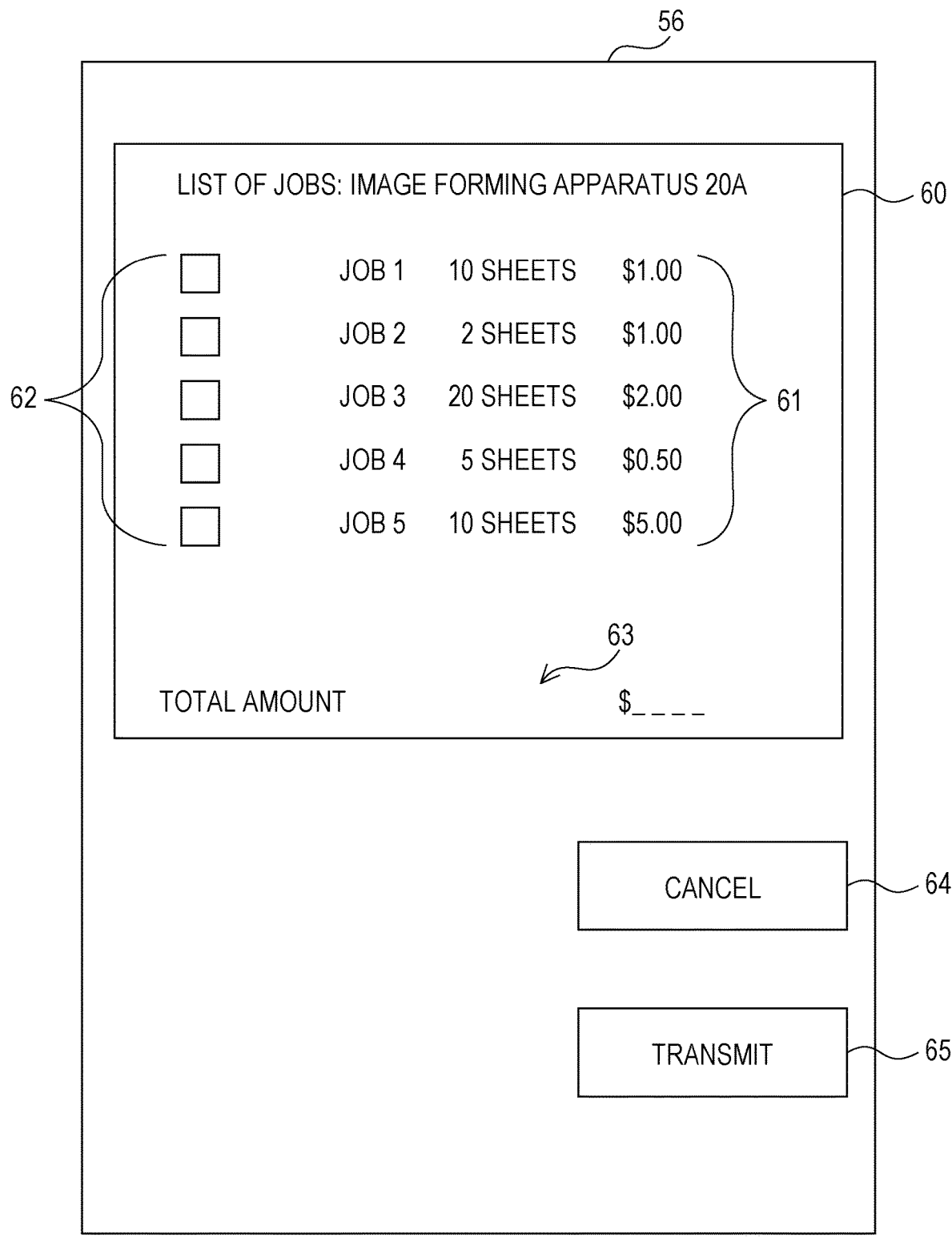
FIG. 12 illustrates a fourth display example displayed on the display of the information processing apparatus.

FIG. 12 illustrates a fourth display example displayed on the display 56 in the information processing apparatus 50. In the display example in FIG. 12, the image forming apparatus 20 having received the authentication information is the image forming apparatus 20A. Although the display contents of the display example in FIG. 12 are identical to the display contents of the display example in FIG. 9 described with reference to the first exemplary embodiment, the job information display sub-regions 61 display the printing fees of the jobs on the image forming apparatus 20A.

Figure 13:
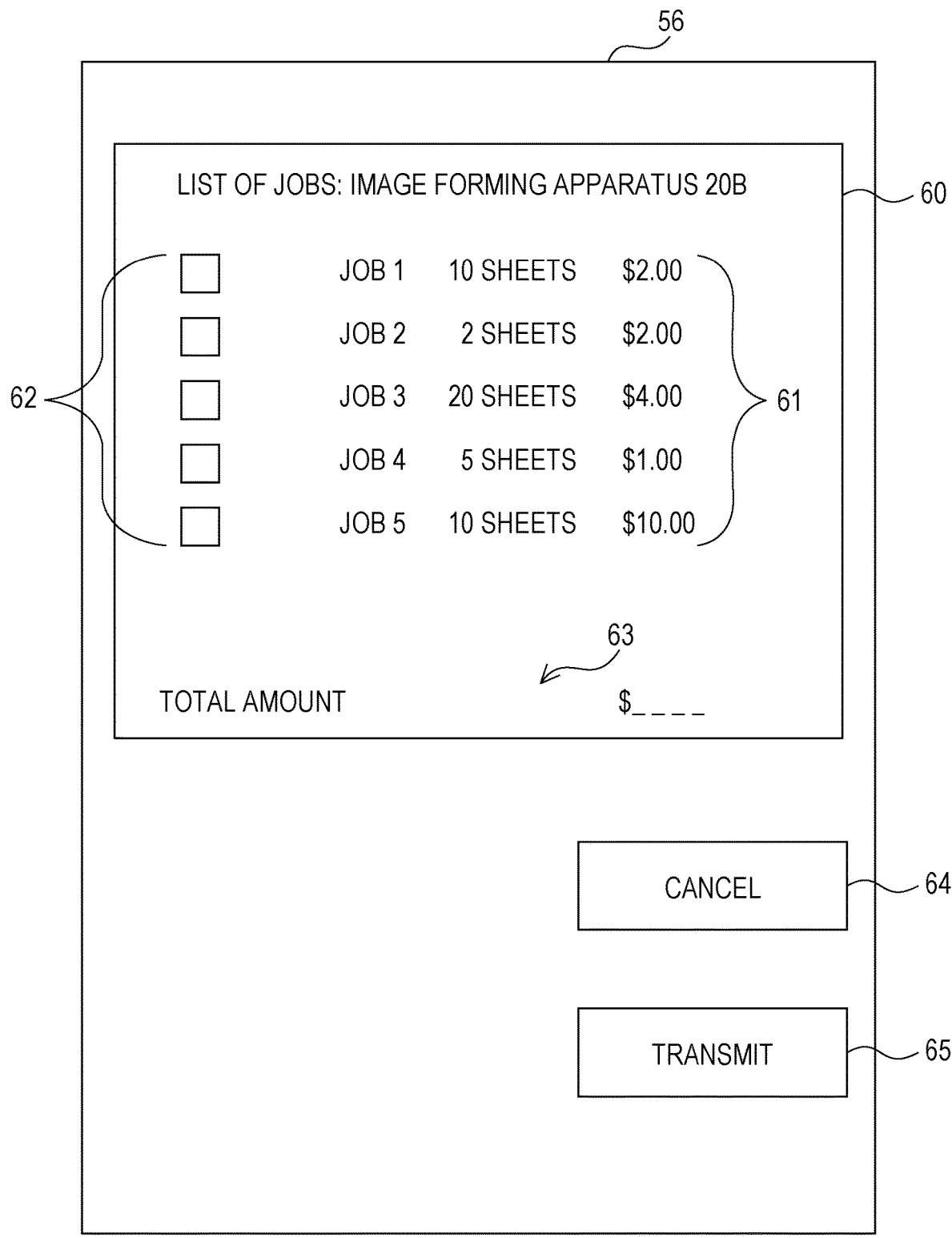
FIG. 13 illustrates a fifth display example displayed on the display of the information processing apparatus.

FIG. 13 illustrates a fifth display example displayed on the display 56 in the information processing apparatus 50. For example, the image forming apparatus 20 having received the authentication information is the image forming apparatus 20B in the display example in FIG. 13. Although the display contents of the display example in FIG. 13 are identical to the display contents of the display example in FIG. 9 described with reference to the first exemplary embodiment, the job information display sub-regions 61 display the printing fees of the jobs on the image forming apparatus 20B.

As described above, the CPU 51 of the second exemplary embodiment acquires the printing fee calculated using the fee information stored on the image forming apparatus 20 having received the authentication information, out of the fee information about printing on and stored on the image forming apparatuses 20 connected to the network N of the server 90. The CPU 51 causes the display 56 to display the printing fee of the job having the matched authentication information on the image forming apparatus 20 having received the authentication information. According to the second exemplary embodiment, the user may be notified of the printing fee that is calculated using the fee information individually managed by the image forming apparatus 20. According to the second exemplary embodiment, each image forming apparatus 20 may individually modify the fee information by individually managing the fee information.

Third Exemplary Embodiment

Third exemplary embodiment is described below while elements common to the first and second exemplary embodiments are briefly described or not described at all.

If functions available in multiple image forming apparatuses 20 connected to the network N of the server 90 are different from each other in the third exemplary embodiment, the CPU 51 causes the display 56 to display a mode corresponding to the function available in the image forming apparatus 20 having received the authentication information. In this way according to the third exemplary embodiment, the user is notified of the function available in the image forming apparatus 20 having received the authentication information.

The storage 94 in the server 90 stores beforehand a list of functions respectively available in the image forming apparatuses 20 connected to the network N. According to the third exemplary embodiment, the list of functions includes at least an indication of the availability of a color printing function and a monochrome printing function. For example, the storage 94 stores an indication that the image forming apparatus 20A is a monochrome apparatus that is enabled to provide the monochrome printing function and an indication that the image forming apparatus 20B is a color apparatus that is enabled to provide the color printing function and the monochrome printing function.

Display examples displayed on the display 56 in the information processing apparatus 50 in step S32 in FIG. 6 are described below. The job information received by the information processing apparatus 50 in step S31 may include jobs having job IDs "job 2" and "job 5" and including the printing information indicative of the color printing and jobs having job IDs "job 1," "job 3," and "job 4" and including the printing information indicative of the monochrome printing. The printing information indicative of the color printing signifies that the color setting included in the printing information is "color" and the printing information indicative of the monochrome printing signifies that the color setting included in the printing information is "monochrome."

Figure 14:
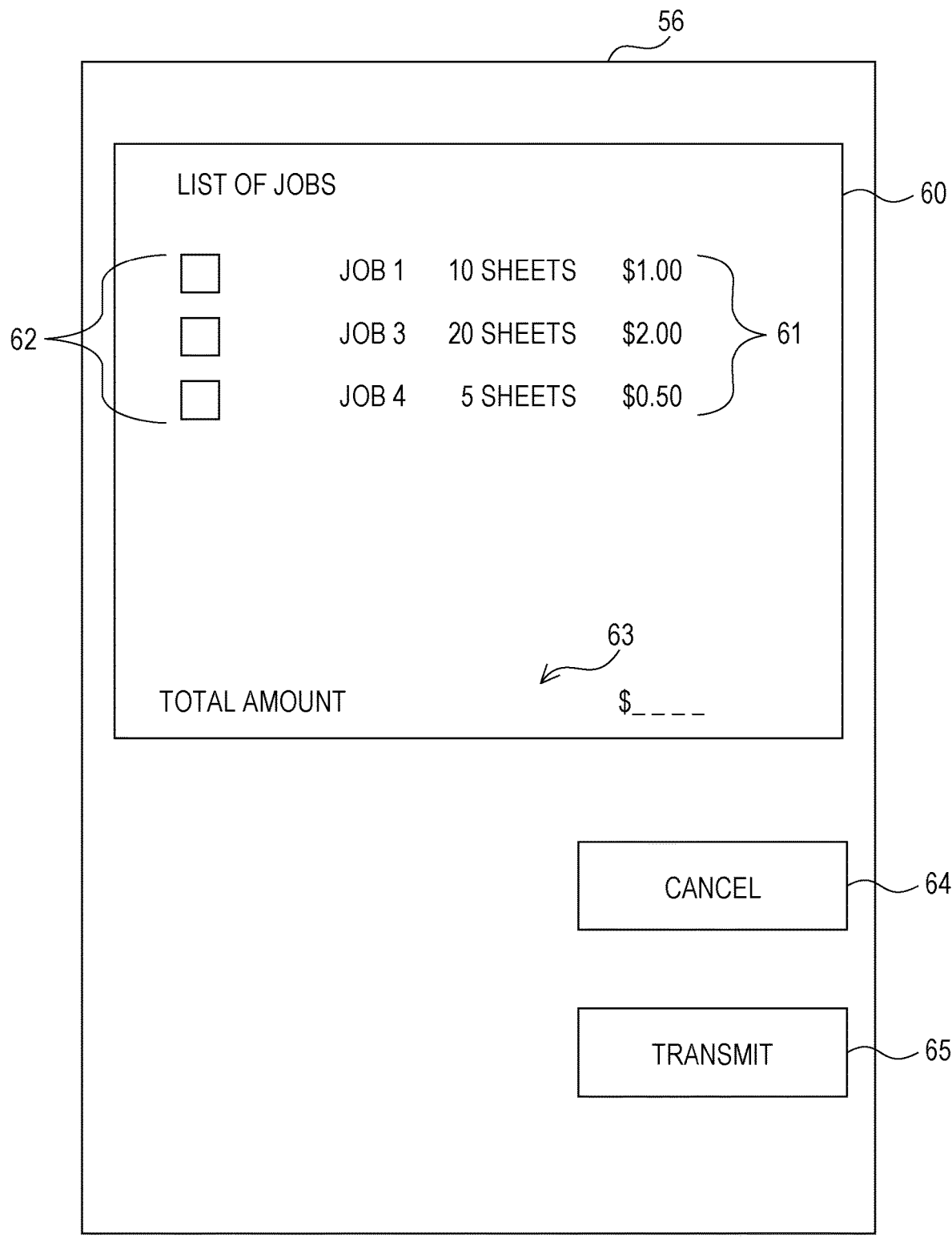
FIG. 14 illustrates a sixth display example displayed on the display of the information processing apparatus.

FIG. 14 illustrates a sixth display example displayed on the display 56 in the information processing apparatus 50. The display example in FIG. 14 indicates that the image forming apparatus 20 having received the authentication information is the image forming apparatus 20A as a monochrome apparatus.

If the image forming apparatus 20 having received the authentication information is a monochrome apparatus in the third exemplary embodiment, the CPU 51 causes the display 56 to not display the job information of a job including the printing information indicative of the color printing but display the job information of a job including the printing information indicative of the monochrome printing. In the sixth display example in FIG. 14, the job information display sub-regions 61 display only the job information on the jobs having job IDs "job 1," "job 3," and "job 4."

According to the third exemplary embodiment, if the image forming apparatus 20 having received the authentication information is a monochrome apparatus as described above, the number of pieces of job information displayed is smaller than when the job information on jobs including the printing information indicative of the color printing is displayed.

According to the third exemplary embodiment, the job information received by the information processing apparatus 50 in step S31 in FIG. 6 includes a job including the printing information indicative of the color printing and a job including the printing information indicative of the monochrome printing. The disclosure is not limited to this setting. If the image forming apparatus 20 having received the authentication information is a monochrome apparatus, the information processing apparatus 50 may not necessarily receive a job including the printing information indicative of the color printing from the image forming apparatus 20.

Fourth Exemplary Embodiment

Fourth exemplary embodiment is described below while elements common to the first through third exemplary embodiments are briefly described or not described at all.

According to the fourth exemplary embodiment, if the image forming apparatus 20 having received the authentication information is a monochrome apparatus, the CPU 51 modifies the job information on a job including the printing information indicative of the color printing, out of the job information acquired from the image forming apparatus 20, into job information in a monochrome printing mode, and causes the display 56 to display the modified job information. According to the third exemplary embodiment, the monochrome printing mode indicates the printing fee in the monochrome printing.

Display examples displayed on the display 56 in the information processing apparatus 50 in step S32 in FIG. 6 are described below. The job information received by the information processing apparatus 50 in step S31 includes jobs having job IDs "job 2" and "job 5" and including the printing information indicative of the color printing and jobs having job IDs "job 1," "job 3," and "job 4" and including the printing information indicative of the monochrome printing.

Figure 15:
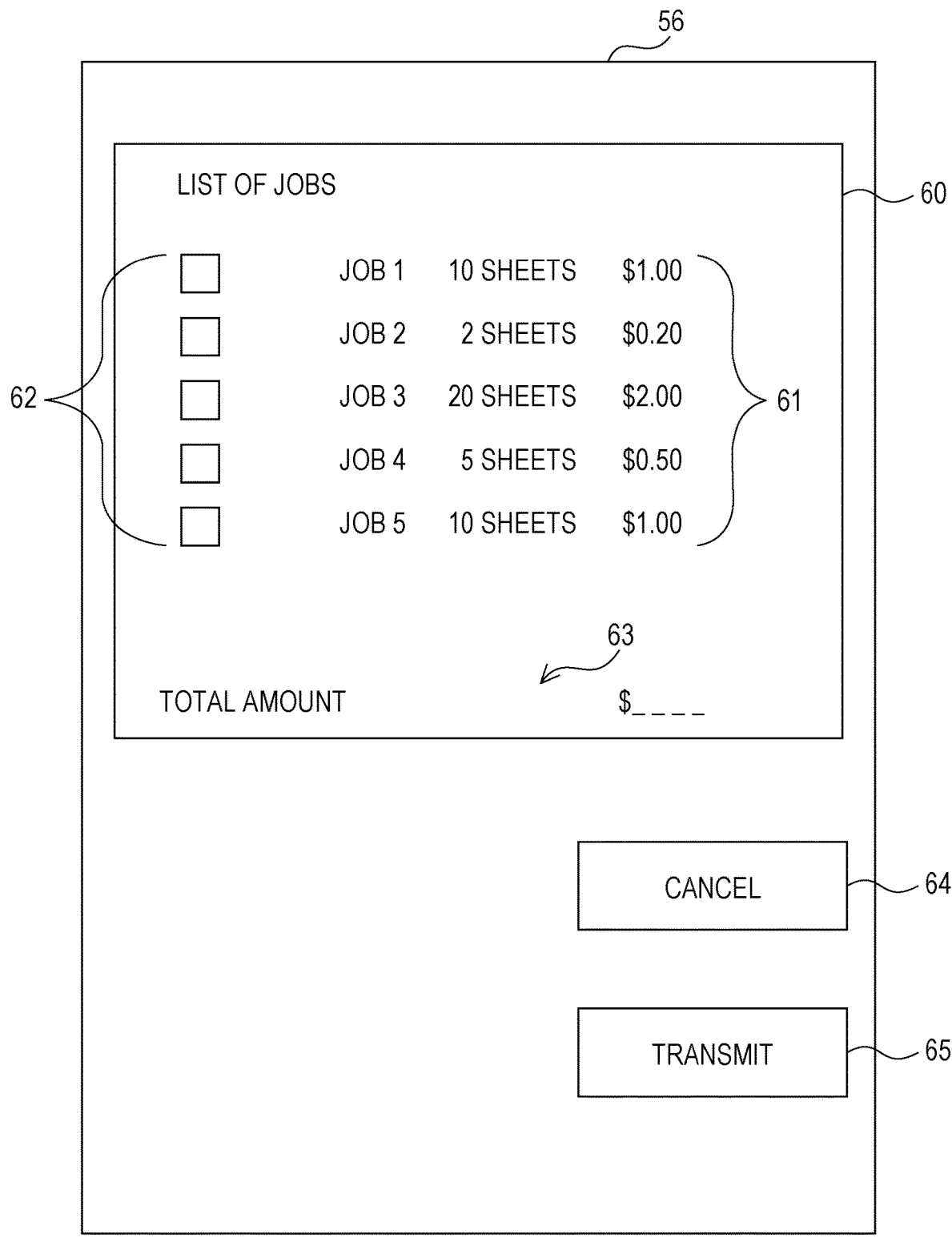
FIG. 15 illustrates a seventh display example displayed on the display of the information processing apparatus.

FIG. 15 illustrates a seventh display example displayed on the display 56 in the information processing apparatus 50. The seventh display example in FIG. 15 indicates that the image forming apparatus 20 having received the authentication information is the image forming apparatus 20A as a monochrome apparatus.

The CPU 51 modifies job information on the jobs having job IDs "job 2," and "job 5" and including the printing information indicative of the color printing, out of the job information received, such that the job information on the jobs has the printing fee when the job is printed in monochrome. Specifically, the CPU 51 calculates the printing fee of each of the jobs, using the number of printing sheets included in the job information on the jobs having job IDs "job 2," and "job 5" and the fee information "$0.10" for 1 sheet for monochrome printing acquired from the image forming apparatus 20A. The CPU 51 causes the job information display sub-regions 61 to display the printing fees when all the jobs corresponding to the job information received in step S31 in FIG. 6 are printed in monochrome.

According to the fourth exemplary embodiment, if the image forming apparatus 20 having received the authentication information is a monochrome apparatus, the number of pieces of job information displayed is larger than when the job information on jobs including the printing information indicative of the color printing is not displayed.

Other Exemplary Embodiments

According to the exemplary embodiments described above, the CPU 51 causes the display 56 to display the printing fee when the job having the matched authentication information is printed on the image forming apparatus 20 having received the authentication information. The disclosure is not limited to such a setting. The CPU 51 may cause the display 56 to display the printing fee when the job having the matched authentication information is printed not only on the image forming apparatus 20 having received the authentication information but also on another image forming apparatus 20 not having received the authentication information and connected to the network N of the server 90.

FIG. 16 illustrates an eighth display example displayed on the display 56 in the information processing apparatus 50. The eighth display example in FIG. 16 indicates the image forming apparatus 20 having received the authentication information is the image forming apparatus 20A.

In the eighth display example in FIG. 16, job information display sub-regions 61A in a job display region 60A display printing fees when jobs having the matched authentication information are printed on the image forming apparatus 20A having received the authentication information. In the eighth display example in FIG. 16, job information display sub-regions 16B in a job display region 60B arranged below the job display region 60A display printing fees when jobs having the matched authentication information are printed on the image forming apparatus 20B connected to the network N of the server 90 and not having received the authentication information.

According to the exemplary embodiments, the user terminal 70 is a mobile terminal carried to the telework office by the user. The user terminal 70 is not limited the mobile terminal carried by the user. The user terminal 70 may be a terminal, such as a personal computer installed beforehand in the telework office.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
transmit authentication information to a first image forming apparatus;
acquire, from the first image forming apparatus, job information acquired by the first image forming apparatus from a server using the authentication information,
wherein the job information is information about one or more jobs corresponding to the authentication information;
cause a display to display a screen presenting the acquired job information;
receive, on the displayed screen, selection of one or more jobs to print using the first image forming apparatus; and
transmit selection information indicating one or more selected jobs selected by the selection to the first image forming apparatus to instruct the first image forming apparatus to acquire the one or more selected jobs from the server,
wherein the server is connected to a plurality of information processing apparatuses including the information processing apparatus by a communication network, and
wherein the processor is configured to, if functions available in the plurality of image forming apparatuses are different from each other, control the screen to present a mode using a function that is available in the first image forming apparatus.

2. The information processing apparatus according to claim 1, wherein the server is connected to a plurality of image forming apparatuses including the first image forming apparatus by a communication network, and
wherein the processor is configured to control the screen to include fees for printing the one or more jobs at the first image forming apparatus.

3. The information processing apparatus according to claim 2, wherein each image forming apparatus of the plurality of information processing apparatuses stores information about print fees of the respective image forming apparatus, and
wherein the fees presented on the screen are calculated using print fees of the first image forming apparatus stored in the first image forming apparatus.

4. The information processing apparatus according to claim 2, wherein the server stores information about print fees of each image forming apparatus of the plurality of image forming apparatuses, and
wherein the fees presented on the screen are calculated using the print fees stored in the server.

5. The information processing apparatus according to claim 1, wherein the processor is configured to, if the first image forming apparatus is unable to provide a color print function but is able to provide a monochrome print function, control the job information to include information about jobs of which printing information indicates monochrome printing and to not include jobs of which printing information indicates color printing.

6. The information processing apparatus according to claim 1, wherein the processor is configured to, if the image forming apparatus having received the authentication information is not enabled to provide a color print function but enabled to provide a monochrome print function only, display on the screen, in a changed monochrome printing mode, the job information about the job including the printing information indicating the color printing out of the job information acquired from the image forming apparatus.

7. An information processing system comprising:
an information processing apparatus including a first processor;

an image forming apparatus including a second processor; and a server including a third processor and storing a plurality of jobs, wherein the first processor is configured to transmit authentication information to the image forming apparatus, wherein the second processor is configured to transmit the authentication information received from the information processing apparatus to the server, wherein the third processor is configured to transmit, to the image forming apparatus, job information about one or more jobs corresponding to the authentication information received from the image forming apparatus, wherein the second processor is configured to transmit the job information received from the server to the information processing apparatus, wherein the first processor is configured to:
cause a display to display a screen presenting the job information received from the image forming apparatus;
receive, on the displayed screen, user selection of one or more jobs a user wants to print using the information processing apparatus; and
transmit selection information indicating the one or more selected jobs selected by the user selection to the image forming apparatus, and wherein the second processor is configured to acquire the one or more selected jobs from the server, and wherein the server is connected to a plurality of information processing apparatuses including the information processing apparatus by a communication network, and wherein the first processor is configured to, if functions available in the plurality of image forming apparatuses are different from each other, control the screen to present a mode using a function that is available in the image forming apparatus.

8. A non-transitory computer readable medium storing a program causing a computer to execute a process, the process comprising:

transmitting authentication information to a first image forming apparatus;

acquiring, from the first image forming apparatus, job information acquired by the first image forming apparatus from a server using the authentication information,
wherein the job information is information about one or more jobs corresponding to the authentication information;

causing a display to display a screen presenting the acquired job information;

receiving, on the displayed screen, selection of one or more jobs to print using the first image forming apparatus; and transmitting selection information indicating one or more selected jobs selected by the selection to the first image forming apparatus to instruct the first image forming apparatus to acquire the one or more selected jobs from the server, wherein the server is connected to a plurality of information processing apparatuses by a communication network, and wherein the process further comprises, if functions available in the plurality of image forming apparatuses are different from each other, control the screen to present a mode using a function that is available in the first image forming apparatus.

* * * * *